Aug. 14, 1956  C. B. SPASE  2,758,689
FIXED SPEED RELEASE CLUTCH
Filed May 15, 1952  3 Sheets-Sheet 1

INVENTOR.
Charles B. Spase
BY
ATTORNEY

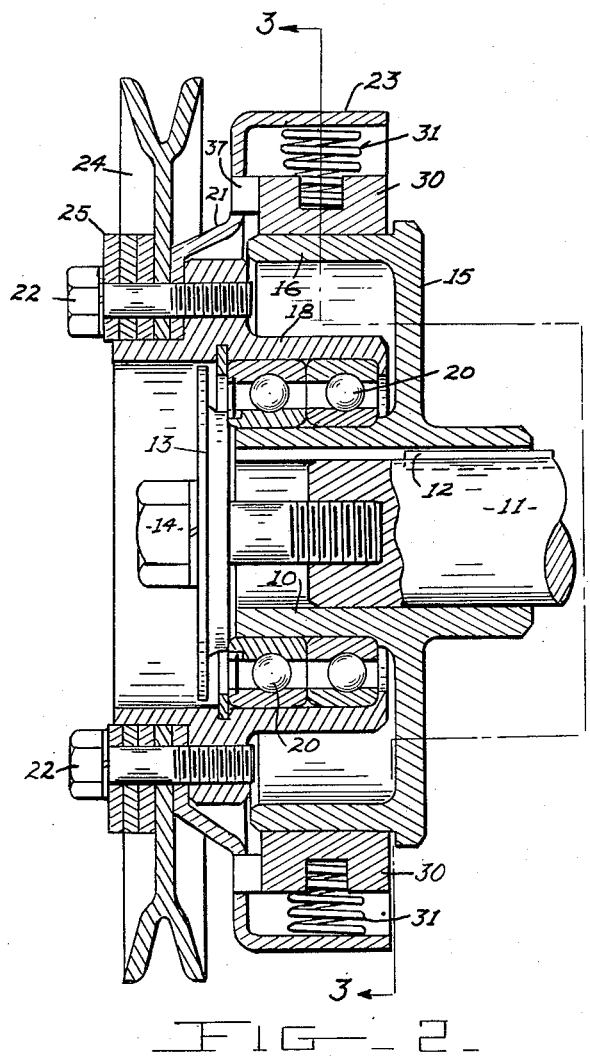

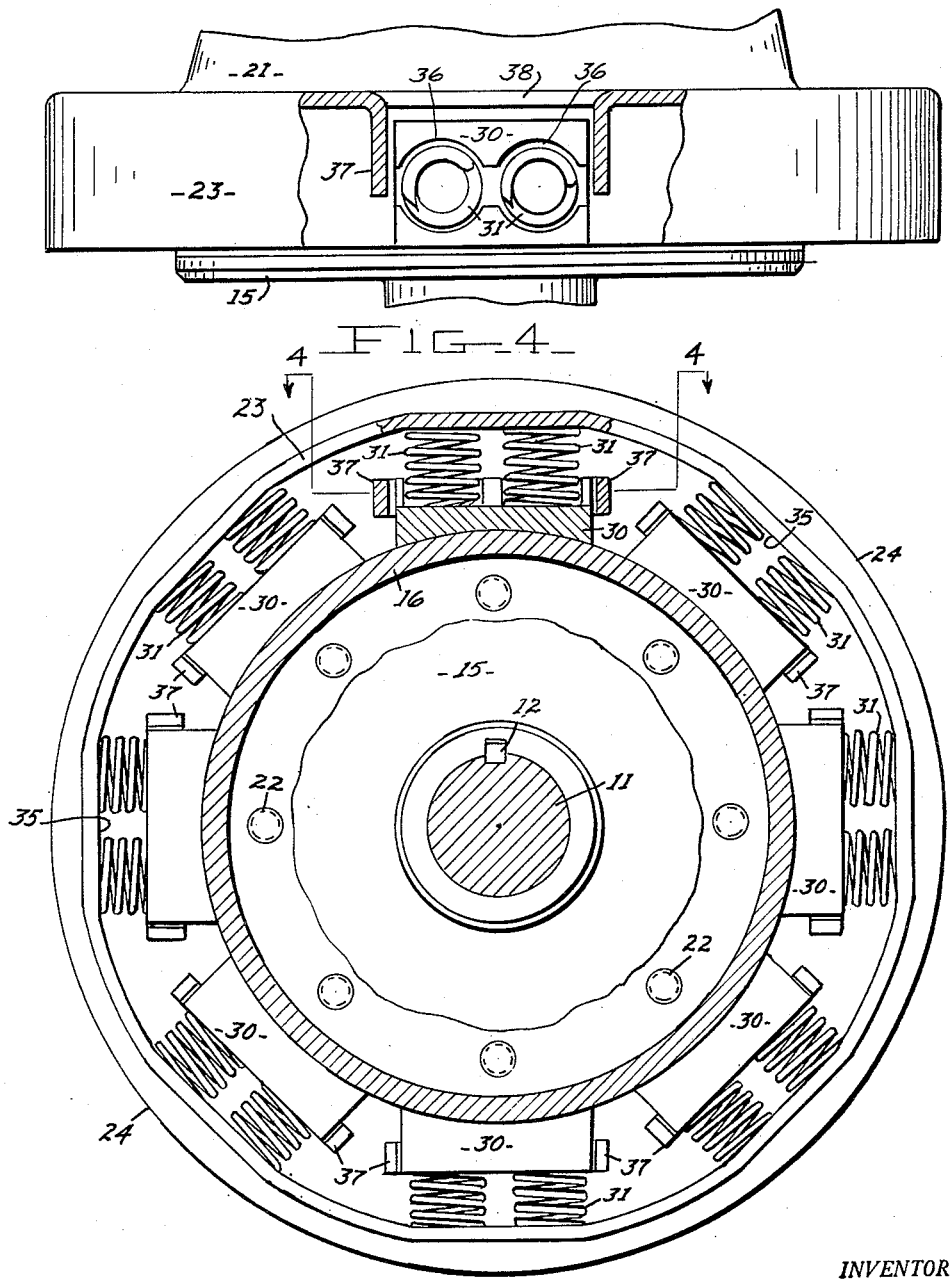

United States Patent Office 2,758,689
Patented Aug. 14, 1956

2,758,689

FIXED SPEED RELEASE CLUTCH

Charles B. Spase, Nedrow, N. Y., assignor to Lipe-Rollway Corporation, Syracuse, N. Y., a corporation of New York Application May 15, 1952, Serial No. 287,943

4 Claims. (Cl. 192—104)

This invention relates to a drive structure for automobile engine accessories, such as the generator, fan, water pump, etc.

At the present time it is conventional practise to drive accessories associated with automobile engines by a pulley fixedly mounted on the forward end of the crank shaft through the medium of a belt trained over the crank shaft, drive pulley and pulleys mounted on the generator, fan, water pump, and the like, and it is also conventional to mount, on the forward end of the engine crank shaft, a balancer or vibration dampening device.

Automotive engines of more recent design operate at relatively high speeds and when operated at or near top speed, the accessories driven by the engine are operated at excessive speed, causing excessive wear to the accessories, the danger of bursting from centrifugal force, and with a much higher consumption of power from the engine.

This invention has as an object an accessory driving device for automotive engines embodying a particularly compact structure having driving and driven members yieldingly coupled together and which function to limit the speed at which the accessories are driven irrespective of the engine speed and which further functions as a balancer or vibration dampener.

The invention consists in the novel features and in the combinations and constructions hereinafter set forth and claimed.

In describing this invention, reference is had to the accompanying drawings in which like characters designate corresponding parts in all the views.

In the drawings—

Figure 2 is an enlarged vertical sectional view of the drive device taken on line 2—2, Figure 1.

Figure 3 is a view taken on line 3—3, Figure 2.

Figure 4 is a view taken on line 4—4, Figure 3.

Figure 1:
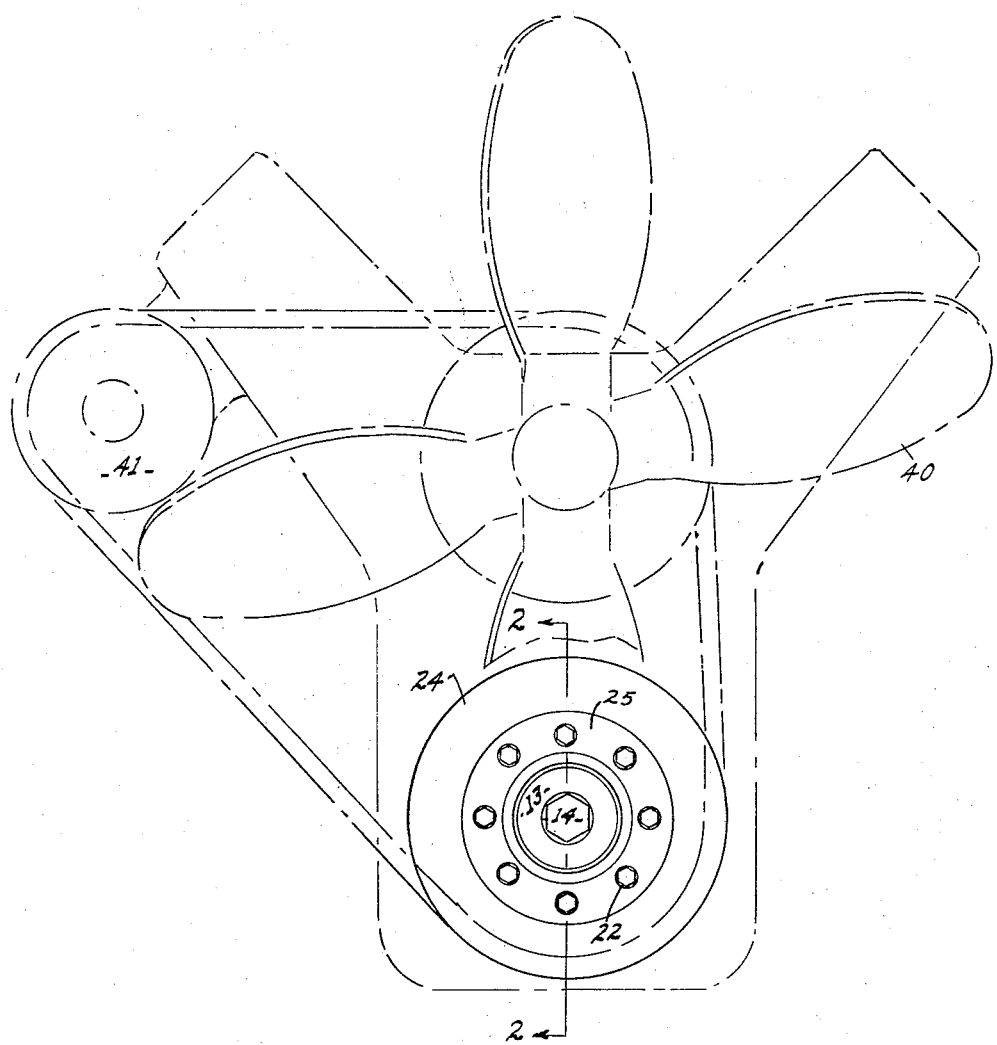
Figure 1 is a schematic front elevational view of an engine equipped with a drive device embodying my invention.

The device comprises a driving member having a hub portion 10 fixedly mounted on the engine crank shaft 11, as by a key 12, washer 13, and screw 14. The driving member is formed with a radially extending flange 15 having a forwardly extending annular friction drum 16, this drum overhanging the forward part of the hub portion and being spaced concentrically therewith.

The driven member consists of a hub portion 18 rotatably mounted on the forward part of the hub portion 10 of the driving member. Preferably, antifriction bearings 20 are positioned intermediate these hub portions. An annular member 21 is detachably mounted to the hub 18, as by screws 22, and is formed with an annular or cylindrical flange 23 arranged in spaced concentric relation to the drum 16. A pulley 24 is mounted upon the forward end of the hub 18 by the screws 22 and there is a series of rings 25 mounted on this assembly and attached thereto by the screws 22. The purpose of the rings 25 is to provide a fly wheel effect to the driven member which may be varied by the size and number of the rings 25.

An annular series of friction shoes 30 are mounted within the annular member 21 and are yieldingly connected thereto by compression springs 31 interposed between the shoes and the flange 23. There are a pair of the springs 31 associated with each of the friction shoes 30, and the flange 23 is flattened, as at 35, to form portions extending parallel with the outer surface of the shoes 30, and the shoes 30 are formed with circular recesses 36 in which the inner portions of the springs are mounted.

With this arrangement, the shoes 30 are spring pressed radially inward in engagement with the friction drum 16 and the springs serve to yieldingly restrain circumferential movement of the shoes relative to the flange 23. The radial wall portion of the member 21 is formed with struck-in portions providing tabs 37 and also providing apertures 38 in the annular member 21 for the circulation of air about the friction shoes 30.

The springs 31 function to effect sufficient fricitional engagement between the shoes 30 and the drum 16 to transmit, up to a certain predetermined R. P. M. of the crank shaft 11, sufficient torque to operate the fan 40 and the generator 41 under full load output. As this predetermined R. P. M. of the crank shaft is reached, the centrifugal force acting against the springs 31 tends to move the shoes 30 radially outward from the drum 16 so as to effect a slipping between the shoes and the drum, and which prevents the annular member 21 and the pulley 24 carried thereby exceeding the predetermined R. P. M. However, at all times there is up to and at this predetermined R. P. M. sufficient torque transmitted to properly operate the accessories driven from the pulley 24, such as the fan 40 and the generator 41. This arrangement is particularly compact whereby it may be substituted for the conventional V belt pulley mounted on the crank shaft for driving such accessories.

Due to the limited yielding movement between the shoes 30 and the driven member in conjunction with the flywheel members 25, this assembly functions as a balancer, or vibration dampener, while simultaneously preventing the build up of excessive speed on the accessories driven by the device.

What I claim is:

1. A drive structure for automobile engine accessories comprising a driving member having a hub portion fixedly mounted on the engine crank shaft and having an annular friction drum portion arranged in spaced concentric relation to said hub portion, a driven member having a hub portion positioned between the hub and drum portions of the driving member and journalled for free rotation on the hub portion of the driving member, said driven member having an annular flange encircling said friction drum in spaced relation thereto, an annular series of friction shoes carried by the driven member, a spring interposed between said annular flange and each of said shoes and being operable to press said shoes radially inward against the drum, the friction engagement between said shoes and drum being effective to transmit a predetermined maximum torque from the drum to said driven member up to a predetermined R. P. M. of the driven member and upon rotation of said driving member above said predetermined speed to maintain said driven member at said predetermined speed under varying torque requirements.

2. A drive structure for automobile engine accessories comprising a driving member having a hub portion fixedly mounted on the engine crank shaft and having an annular friction drum portion overhanging said hub portion in spaced concentric relation thereto, a driven member having a hub portion journalled for free rotation on the hub portion of the driving member, an annular flange detachably mounted on the hub portion of the driven member, said flange encircling said friction drum in spaced relation thereto, an annular series of friction shoes positioned on said friction drum, a spring interposed between said annular flange and each of said and being operable to press said shoes radially inward against the drum, the friction engagement between said shoes and drum being effective to transmit a predetermined maximum torque from the drum to said driven member up to a predetermined R. P. M. of the driven member and, upon rotation of the driving member above said predetermined speed, to maintain said driven member at said predetermined speed under varying torque requirements.

3. A drive structure for automobile engine accessories comprising a driving member having a hub portion fixedly mounted on the end of the engine crank shaft, a driven member having a hub portion journalled for free rotation on the hub portion of the driving member, said driving member having an annular friction drum encircling the hub portion of the driven member, an annular flange mounted upon the hub portion of the driven member and encircling said friction drum in spaced relation thereto, an annular series of friction shoes arranged within said annular flange, an accessory drive pulley and a fly wheel mounted upon the hub portion of said driven member, means common to said flange, pulley and fly wheel to detachably secure the same to the hub portion of the driven member, a spring interposed between said annular flange and each of said friction shoes and being operable to press said shoes radially inward against the drum, the frictional engagement between said shoes and drum being effective to transmit a predetermined maximum torque from the drum to said driven member up to a predetermined R. P. M. of the driven member and upon rotation of said driving member above said predetermined speed to maintain said driven member at said predetermined speed under varying torque requirements of the driven accessories.

4. A drive structure for automobile engine accessories as defined in claim 1 and including means positioned within the hub of said driven member and operable to restrain axial movement of said driven and driving members.

References Cited in the file of this patent
UNITED STATES PATENTS

| | | |
|---|---|---|
| 846,814 | Anderson | Mar. 12, 1907 |
| 1,114,069 | Trotter | Oct. 20, 1914 |
| 1,955,304 | Libby | Apr. 17, 1934 |
| 2,005,486 | Wilson | June 18, 1935 |
| 2,024,677 | Bosma | Dec. 17, 1935 |
| 2,223,660 | Horton | Dec. 3, 1940 |
| 2,225,072 | Meyerhoeffer | Dec. 17, 1940 |
| 2,256,987 | Meyerhoeffer | Sept. 23, 1941 |
| 2,607,327 | Lee | Aug. 19, 1952 |
| 2,612,249 | Horn | Sept. 30, 1952 |
| 2,663,397 | Scott | Dec. 22, 1953 |